Aug. 8, 1933.    J. ROBINSON    1,921,482
AUTOMATIC TRAIN PIPE CONNECTER
Original Filed April 24, 1929
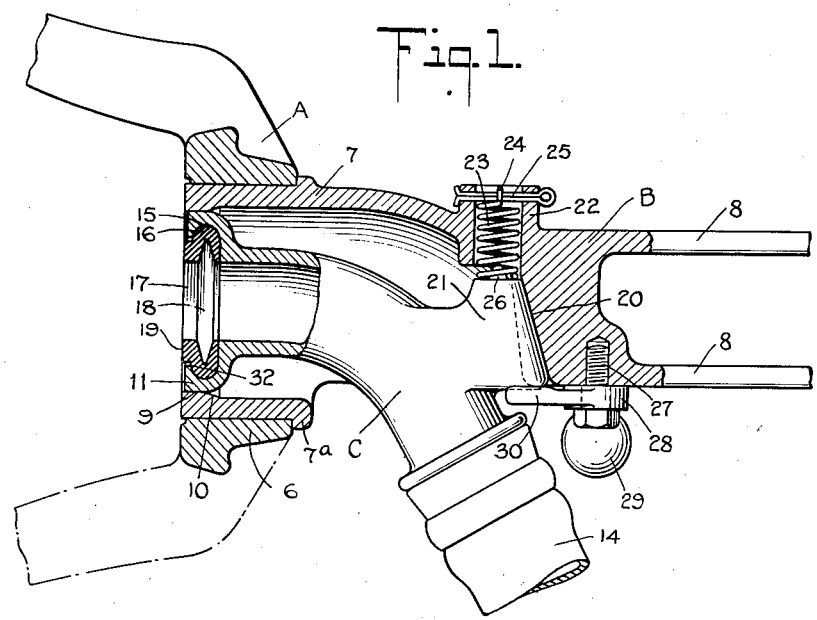
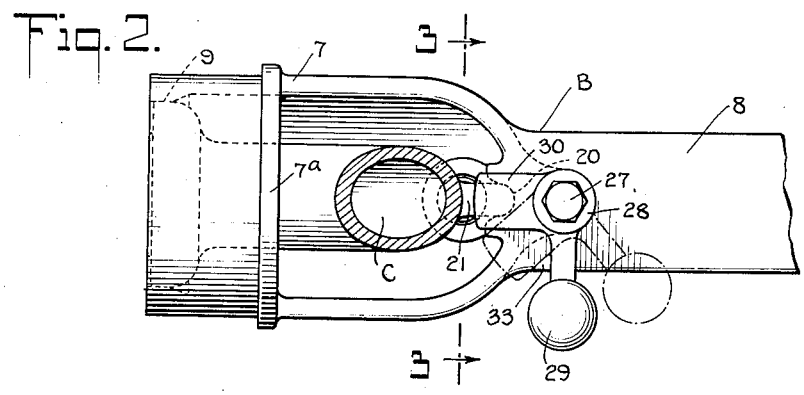
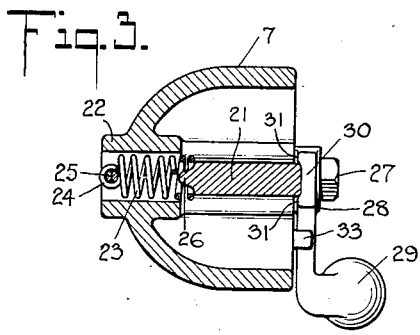
INVENTOR
Joseph Robinson
BY
Watson, Coit, Morse & Grindle
ATTORNEY Patented Aug. 8, 1933

1,921,482

UNITED STATES PATENT OFFICE 1,921,482

AUTOMATIC TRAIN PIPE CONNECTER

Joseph Robinson, New York, N. Y.

Application April 24, 1929, Serial No. 357,853
Renewed June 4, 1932

11 Claims. (Cl. 285—58)

This invention relates to automatic train pipe connecters, and particularly to means for replacing defective gaskets therein while the coupling heads of such connecters remain coupled.

In the accompanying drawing,

Figure 1 is a sectional plan view of my improvements in the service position. In this view only a part of the coupling head and its supporting shank are shown.

Figure 2 is a sectional side elevation of the construction shown in Figure 1. In this view the coupling head is omitted and the rear end of the fitting C has been cut away to more clearly show the parts, and Figure 3 is a sectional front view on the line 3—3 of Figure 2.

The coupling head A may be of any desired type. I preferably provide it with a sleeve 6 into which is pressed, or otherwise secured to the head, the enlarged hollow forward end of chamber 7 of a suitable rearwardly extending shank B. The shank includes spaced straps or members 8 adapted to span the usual bracket (not shown) which attaches the connecter to the car. These straps are preferably integral with the hollow end or chamber 7, which hollow end is provided with an annular ring or shoulder 7ª against which the shank 16 of the coupling head A abuts to position the head on the shank and to prevent any possibility of the head shifting thereon under the strains of service. For a more detailed showing of these parts reference is made to my co-pending application Serial #488,373 filed July 29th, 1921, Patent No. 1,787,122 of December 30, 1930 for Improvements in automatic train pipe connecters. The front face of the shank B is approximately flush with the coupling face of the head A, as shown in Figure 1, and is provided with an interior annular ring or seat 9, slightly tapered at 10 to facilitate inserting therein head 11 of a tubular conduit C. The conduit curves laterally out of an opening in one side of the chamber 7 as shown, and is connected in any desired manner to a suitable hose 14. The head 11 of the conduit is provided with an interior annular groove or seat 15 in which is mounted the complementary flange 16 of a resilient gasket 17. The flange of the gasket is also grooved annularly as at 18, and the coupling face 19 thereof lies approximately in the plane of the coupling face of the head A, as shown. The groove 18 admits to the gasket the fluid pressure carried, which expands the gasket axially and radially into air tight engagement with the walls of its seat in the conduit C and with the face of a mating gasket. To support the conduit C horizontally in the chamber 7 I provide the rear wall of the chamber with a groove or seat 20. The seat extends transversely of the shank B at an angle to the longitudinal direction thereof and receives a part of the projection or lug 21 of the conduit C. The mating surfaces of the seat and the tongue are preferably machine finished.

That wall of the chamber 7 which is opposite the opening through which extends the curved rear end of the conduit C, I provide with an opening or housing 22, and in this housing I mount a spring 23. The spring is provided with an eye 24 through which a cotter pin 25 extends to tie the spring in place and serve as an abutment for it. The inner end of the spring bears against the lug 21 and holds the same against the latch 28 hereinafter described. A guide or projection 26 projects into the spring to position the latter on its said seat and prevent undue forward movement of the conduit C in the chamber when the connecter is uncoupled.

To lock the conduit in place, I pivotally mount on the shank, as by the pin 27, a rugged latch 28 provided with a weighted handle 29 which holds it normally in the locked position shown in Figure 1. The finger or tongue 30 of the latch swings across the path of the lug 21 and locks the conduit C in the chamber B. The finger is grooved to form inwardly extending lips 31 which straddle the lug as shown particularly in Figure 3. These lips cause the spring 23 to be compressed when the handle 29 is lifted, which arrangement constitutes supplemental locking means for maintaining the latch and conduit in the service position shown in Figure 1. The co-operating angled surfaces of the lug 21 and the groove or seat 20 provide cam means for adjusting the conduit longitudinally in the chamber to bring it into the desired position. It will be apparent, therefore, that the gasket 17, when expanded by the pressure fluid carried, will be compressed slightly when the handle 29 is raised. The front face of the conduit head 11 preferably lies slightly behind the coupling face of the head A when coupled which permits of this compression. When the air pressure is admitted to the conduit the gasket expands and presses the lug 21 firmly against the seat 20. This automatically increases the locking effect between the finger 30 and the lug 21. It will be noted that the opening in the face of the conduit head 11 is larger than the face diameter of the gasket 17. This permits the forward portion of the gasket to move forwardly, under the fluid pressure, for a limited distance in substantially a vertical plane, instead of forcing such portion to roll forward around the point 32 of the conduit head 11. A stop 33 on the shank B limits the downward movement of the handle 29.

What I claim is:

1. In combination, an automatic train pipe connecter head having a hollow shank, a conduit mounted in said shank, and means for permitting removal of said conduit while said head is coupled to a companion head, said means including co-operating parts on said shank and said conduit, a latch engaging one of said parts to lock the conduit in said hollow shank and resilient means acting against said conduit to increase the locking effect of said latch.

2. In combination, an automatic train pipe connecter head having a hollow shank, a conduit mounted in said shank and supporting a gasket, and means for permitting removal of said conduit while said head is coupled to a companion head, said means including a projection on said conduit, a latch engaging said projection to lock the conduit against lateral movement in said shank, and resilient means acting transversely of said hollow shank to increase the locking effect on said shank.

3. In combination, an automatic train pipe connecter head having a hollow shank, a conduit mounted in said shank and carrying a gasket, and means for permitting removal of said conduit while said head is coupled to a companion head, said means including co-operating parts on said shank and said conduit, a latch engaging one of said parts to lock the conduit in said hollow shank, resilient means acting transversely of said hollow shank to hold a portion of said conduit firmly against said latch, said gasket having an internal annular groove therein for receiving compressed fluid flowing through the conduit, whereby said gasket tends to expand and force said conduit rearwardly and thereby co-operate with said resilient means to increase the locking effect of said latch.

4. In combination, an automatic train pipe connecter head having a hollow shank, a conduit mounted in said shank, and means for permitting removal of said conduit while said head is coupled to a companion head, said means including a projection on said conduit adapted to engage a seat on said tank, the conduit being insertable into the shank from one side thereof, and resilient means carried by the shank and cooperating with said projection to position the conduit in the shank.

5. In combination, an automatic train pipe connecter head provided with an opening, a hollow shank secured therein, said shank comprising spaced members which terminate at their forward ends in a chamber open at one side, a fluid conduit insertable into and removable from said chamber through said opening in the latter, said conduit being adapted to move forwardly in said chamber as it is inserted in the latter to bring the front face of the conduit into a position adjacent the front end of said chamber, a seat on said shank, a projection on said conduit engaging said seat, and means co-operating with said seat to position the conduit in said chamber and to lock the conduit in place, said means including a swinging latch and transversely acting resilient means for holding said projection against the latch.

6. In combination, an automatic train pipe connecter head having a hollow shank, a seat positioned substantially midway vertically of said hollow shank, a conduit mounted in said shank and supporting a gasket therein, said conduit being provided with a projection which is mounted on said seat whereby the conduit is positioned vertically and longitudinally in said shank, a latch engaging said projection for locking the conduit in the shank, and a spring extending transversely of said shank and pressing said projection against said latch whereby accidental movement of said latch from the locked position is prevented.

7. In combination, an automatic train pipe connecter head having a hollow shank, a conduit removably mounted therein and provided with a projection, a seat in said shank formed on substantially the vertical center line of the shank and on which said projection is mounted, and means for locking said conduit on said seat, said means including a spring into which part of said projection extends, and a grooved latch engaging said projection, said spring serving to maintain said projection normally in said groove and to limit the forward movement of said conduit in the shank.

8. In combination, an automatic train pipe connecter head having a hollow shank, a conduit removably mounted in said shank and having a projection resting on a seat in the shank, a spring lying in the path of said projection and against which the projection bears, a latch also lying in the path of said projection and adapted to be swung across the face of the latter to co-operate with said spring to removably lock said conduit in said shank.

9. In combination, an automatic train pipe connecter head having a hollow shank provided with an opening on one side, a conduit mounted in the hollow of said shank and extending rearwardly and laterally thereof out of said opening, a latch mounted on said shank adjacent said opening and arranged to engage said conduit when positioned in said hollow shank, and a spring arranged to normally press said conduit against said latch.

10. In combination, an automatic train pipe connecter head having a hollow shank, a conduit mounted in said shank, a gasket supported by said conduit adjacent the front face of said head, and means for removably holding said conduit in said hollow shank, said means including cooperating parts on said shank and said conduit, a latch engaging one of said parts to lock the conduit in said hollow shank, and resilient means acting against said conduit to increase the locking effect of said latch.

11. In combination, an automatic train pipe connecter head having a hollow shank provided with an opening on one side, a conduit mounted in the hollow of said shank, a gasket carried by said conduit and arranged adjacent the face of said head, said conduit extending rearwardly from a point adjacent the front face of said head and laterally thereof out of said opening, a latch mounted on said shank adjacent said opening and arranged to engage said conduit when positioned in said hollow shank, and a spring arranged to normally press said conduit against said latch.

JOSEPH ROBINSON.